United States Patent Office 3,374,413
Patented Mar. 19, 1968

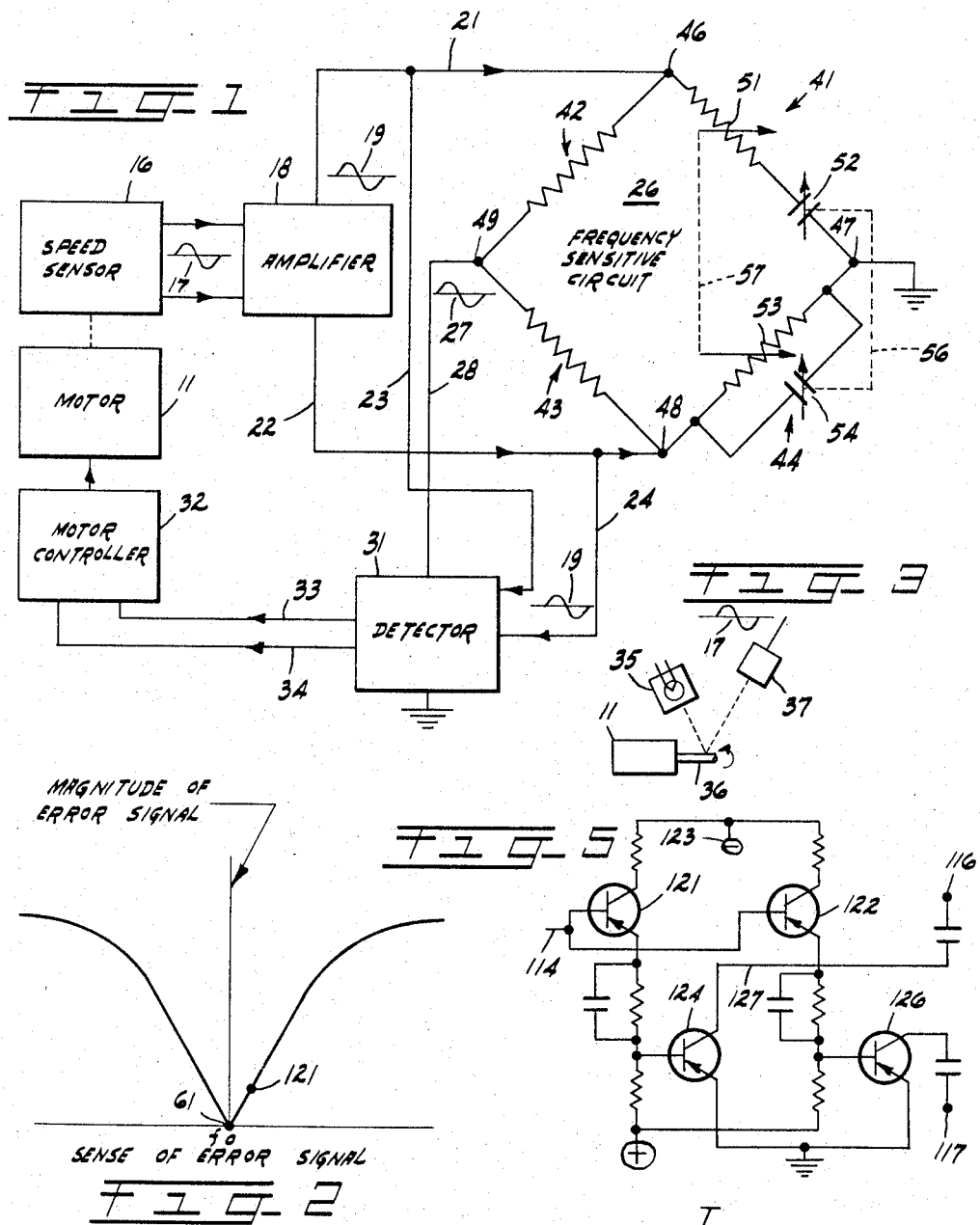

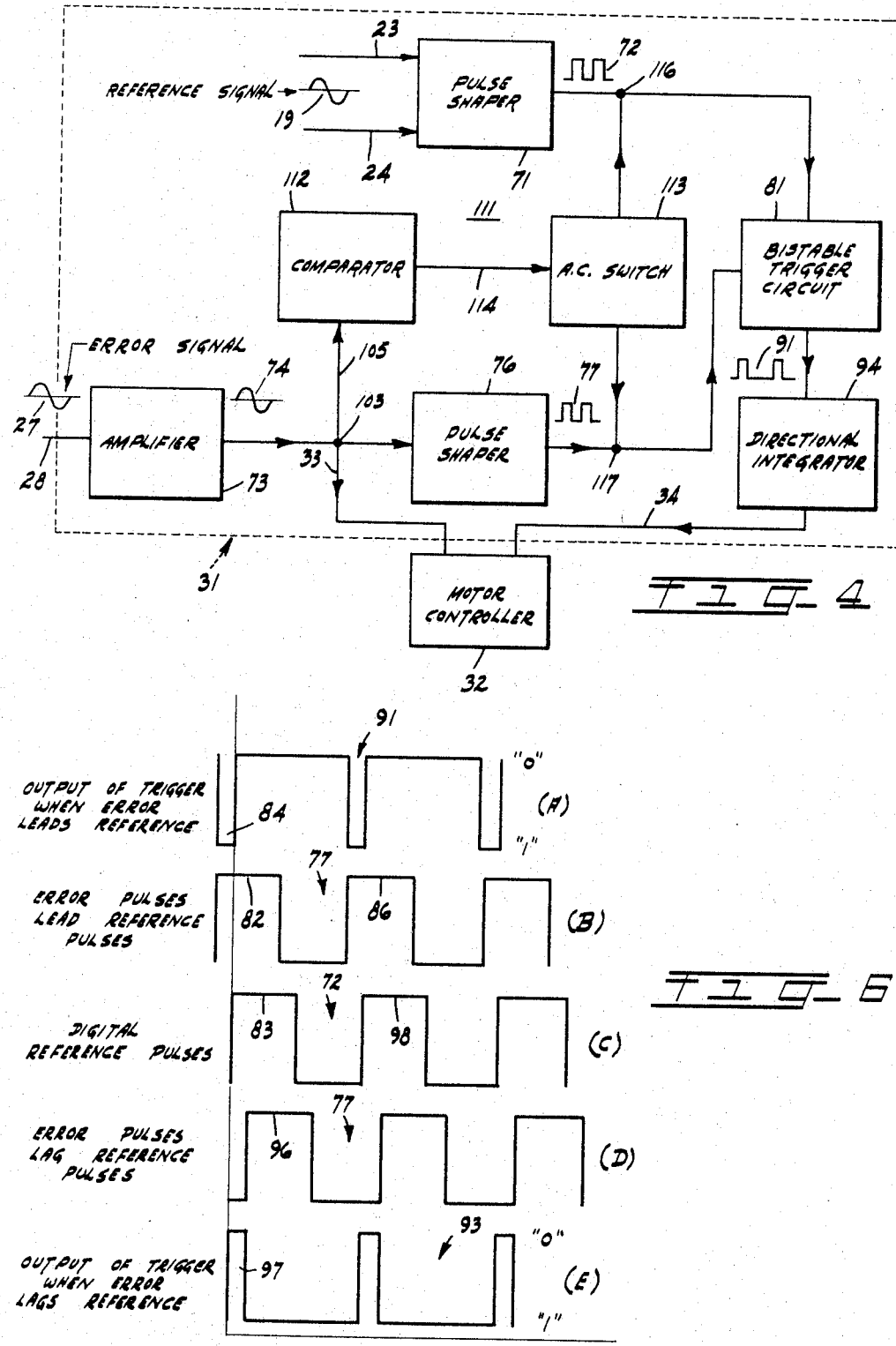

3,374,413
SYSTEM FOR MAINTAINING A MOTOR
AT A PREDETERMINED SPEED
Georg Dornberger, Murray Hill, and William M. Smith, Jersey City, N.J., assignors to Western Electric Company, Incorporated, New York, N.Y., a corporation of New York
Filed May 6, 1965, Ser. No. 453,605
12 Claims. (Cl. 318—341)

ABSTRACT OF THE DISCLOSURE

The disclosure is a highly sensitive and linear operating control system for maintaining a motor constant at a prescribed speed, and involves a frequency sensitive bridge tuned to balance at a frequency indicative of the prescribed speed. An input reference signal has a frequency representing the actual motor speed and is fed to the bridge. The bridge provides an error signal representative of the difference between the actual speed and the prescribed speed. The error and reference signals are fed to a detector network. The detector converts the respective signals to digital pulses which are compared in a bistable trigger circuit. The latter provides digital correction pulses which are used to indicate the sense of the error signal deviation for regulating the motor. The detector is designed to feed correction control signals to a motor controller for returning the motor to its prescribed speed. A noise and harmonic check circuit shorts out operation of the detector in the region of bridge balance. This eliminates spurious correction control signals due to noise and harmonics.

---

This invention relates to a system for maintaining a motor at a predetermined speed. More particularly, the invention relates to such a system wherein the magnitude and direction of the deviation of the actual speed from the predetermined speed of the motor is corrected utilizing digital pulses.

In conventional systems for controlling the speed of a motor, a tachometer-generator is usually coupled to a rotating motor shaft. The tachometer generates an A.C. signal which is a function of the actual motor speed.

In one type of conventional system, the tachometer signal is rectified to produce a D.C. voltage which is compared with a reference voltage in a conventional voltage comparator circuit. In such a system, a single D.C. volt may represent hundreds or even thousands of motor shaft revolutions. In the present state of the art of tachometer-generator design, a tachometer-generator cannot linearly generate a minute fraction of a volt to represent a single shaft revolution. Thus, the accuracy of this type of conventional system is limited at the outset by the inability of tachometer-generators to linearly represent the actual motor speed.

In another type of conventional system, the tachometer signal is applied to an RC network which produces a pulsating voltage representative of the motor speed. The pulsating voltage is applied to a winding of a servomotor which controls a potentiometer in a conventional voltage comparator circuit.

The voltage comparator circuit employed in both of these conventional systems usually comprises a vacuum tube regulator. The difference between the voltage representing the actual motor speed and the reference voltage is applied to a conventional motor control unit to adjust the speed of the motor. Since vacuum tubes are somewhat unstable devices and are adversely affected by transient voltages and aging effects, other limiting factors may be introduced into the accuracy of conventional motor control systems.

Thus, both type conventional systems ultimately involve voltage comparison techniques and the adverse accuracy limiting factors associated with them.

The response of conventional systems is usually non-linear in the area at and near the inflection point of the system response curve of error of actual speed from predetermined speed versus direction of the error. The response of conventional systems is usually curved somewhat in the manner of a half-sine wave. Since the system response curve is not linear, the voltage comparator circuit cannot linearly detect small voltage changes in the inflection point area; therefore, conventional motor control systems cannot linearly return the motor to the predetermined speed.

It can be seen that in conventional motor control systems, there is an accumulation of possible factors adversely affecting the accuracy of control of the motor speed; more particularly, representation of actual motor speeds by non-linear voltages, instability of vacuum tube comparator circuits, and the non-linearity of the system response.

It is desired to correct the actual speed of a motor when it deviates from the predetermined speed such that there is no overshoot of the predetermined speed when adjusting the actual motor speed. This can best be done when control of the actual motor speed, at and near the predetermined speed, is linear. Thus, if the actual speed of the motor is not linearly represented, as discussed above in connection with conventional motor control systems, then it is improbable that control of the actual motor speed will be linear. The system of this invention provides a linear representation of actual motor speed and a linear return of the motor to the predetermined speed without overshoot, free of the accuracy limiting factors associated with prior art systems discussed above.

Accordingly, an object of the present invention is to provide a new and improved system for maintaining a motor at a predetermined speed.

Another object is to provide a new and improved system for maintaining a motor at a predetermined speed wherein the magnitude and deviation of actual speed from predetermined speed of the motor is corrected utilizing digital pulses.

Another object is to provide a system for maintaining a motor at a predetermined speed wherein the actual speed of the motor and the deviation of actual speed from predetermined speed are linearly represented by respective pluralities of digital pulses, the respective pluralities of digital pulses energizing facilities to linearly correct the deviation.

Another object is to provide a system for maintaining a motor at a predetermined speed wherein the motor is returned to the predetermined speed from the direction of deviation of the actual speed towards the predetermined speed only. A related object is such a system wherein there is no overshoot when the motor is returned to the predetermined speed.

With these and other objects in view a system for maintaining a motor at a predetermined speed, illustrating certain features of the invention, includes a speed sensor unit which senses the actual speed of the motor shaft and which generates a reference signal of a frequency representing the actual speed. The reference signal is applied to energize a frequency sensitive circuit which balances in response to a reference signal of a frequency representing the predetermined speed.

The frequency sensitive circuit produces an error signal when the actual speed deviates from the predetermined speed, the error signal being indicative of the deviation. A detector includes circuits which are responsive to convert the reference signal and error signal to digital reference pulses and digital error pulses respectively, such that the actual speed and the deviation of actual speed from predetermined speed are represented by digital pulses. The detector includes other circuits which are responsive to the digital reference pulses and the digital error pulses to produce a correction signal indicative of the magnitude and sense of the deviation. A motor controller is responsive to the correction signal to return the motor to predetermined speed.

The system of this invention has several advantages over conventional speed control systems. More particularly, the use of a plurality of digital pulses to represent each revolution of the motor shaft results in accurate representation of the actual motor speed. Also, the use of a frequency sensitive circuit which has a linear response results in the production of a linear error signal at and near the predetermined speed. Additionally, the deviation of actual motor speed from predetermined speed is corrected independent of voltage comparison techniques, and without overshoot.

Other objects and advantages of the invention will become apparent by reference to the following detailed specification and accompanying drawings, wherein:

FIG. 1 is a block diagram of a system for maintaining a motor at a predetermined speed incorporating certain features of the invention, the system including a speed sensor, a frequency sensitive circuit, a detector, and a motor controller;

FIG. 2 is the response curve for the system of the invention showing the linearity of the error signal at and near the predetermined speed;

FIG. 3 is an electrical schematic diagram illustrating one type of speed sensor which may be used with the system of this invention;

FIG. 4 is a block diagram showing the different units of the detector;

FIG. 5 is an electrical schematic diagram of an error check network which renders the detector ineffective if noise or other interference signals are applied to the detector; and FIG. 6 is a waveform diagram showing the manner in which the system of the invention senses the deviation of the actual speed from the predetermined speed.

*General description*

With reference to FIG. 1, there is shown schematically a motor 11 which is to be maintained at a predetermined speed. A speed sensor 16 is coupled to the motor shaft and generates an A.C. reference signal 17. Reference signal 17 has a frequency and amplitude representative of the actual speed of the motor shaft. Reference signal 17 is applied to a conventional linear amplifier 18 which produces an amplified reference signal 19. Reference signal 19 is applied over leads 21 and 22 to a frequency sensitive circuit 26, and over leads 23 and 24 to a detector 31.

Frequency sensitive circuit 26 is tunable to a balance frequency ($f_0$) which represents the predetermined or desired speed of motor 11. If the actual speed deviates from the predetermined speed, frequency sensitive circuit 26 produces an A.C. error signal 27 which has a phase or sense and a magnitude corresponding to the deviation. Error signal 27 is applied over a lead 28 and ground to detector 31.

Detector 31, the details of which are shown in FIG. 4, includes circuits which convert reference signal 19 and error signal 27 to digital reference pulses and digital error pulses, respectively. Other circuits of detector 31 are responsive to the reference pulses and the error pulses to produce a correction signal which is applied over leads 33 and 34 to a conventional motor controller 32. Motor controller 32 is responsive to the correction signal to increase or decrease the speed of motor 11 toward the predetermined speed. Motor controller 32 may be any of a number of conventional speed control devices for performing the actual mechanics of adjusting the speed of motor 11, for example a Speed Variator, Model 5-0653-2, manufactured by the General Electric Company.

*Speed sensor*

Referring to FIG. 3, there is shown one conventional apparatus which may be used as speed sensor 16. A light source 35 directs light rays towards an indicia (not shown) on shaft 36 of motor 11, the light rays being reflected towards a photoelectric device 37 which produces a plurality of pulses for each shaft revolution, the pulses comprising a signal representative of the actual speed. Photoelectric device 37 includes conventional circuits for shaping the pulses to reference signal 17 which approximates a sine wave and which is comprised of a plurality of sine wave cycles for each revolution of shaft 36. An optical speed sensor 16 of the type above-described may incorporate a commercially available optical tachometer, Model 506–A, manufactured by the Hewlett-Packard Company to produce the pulses.

*Frequency sensitive circuit*

In one embodiment of the invention, frequency sensitive circuit 26 is a Wien bridge having four legs 41–44 interconnected at junctions 46–49, junction 47 being connected to ground. Legs 42 and 43 each comprise a resistor of a fixed resistance value. Leg 41 comprises a variable resistor 51 connected in series with a variable capacitor 52. Leg 44 comprises a variable resistor 53 connected in parallel with a variable capacitor 54. Wien bridge 26 can be tuned in a conventional manner to balance or null of an applied signal of the predetermined or balance frequency $f_0$, which is applied over leads 21 and 22 to junctions 46 and 48, by adjusting resistors 51 and 53 and capacitors 52 and 54.

When a reference signal 19 of the balance frequency is applied to junctions 46 and 48, bridge 26 is balanced and no error signal 27 is developed across output junctions 47 and 49. In the use of bridge 26 in the most efficient manner and according to this invention, capacitors 52 and 54 are of equal capacitance value and adjustable by a single control arm 56, and resistors 51 and 53 are of equal resistance value and adjustable by another single control arm 57. Under these conditions, the balance frequency of bridge 26 is determined in accordance with the following equation:

$$f_0 = \tfrac{1}{2}\pi RC$$

where
$f_0$ = balance frequency
$R$ = resistance value of resistors 51 and 53
$C$ = capacitance value of capacitances 52 and 54

When the frequency of reference signal 19 deviates from the balance frequency of bridge 26—this occurs when the actual motor speed deviates from the predetermined motor speed—bridge 26 is unbalanced. When unbalanced, bridge 26 develops an error signal 27 which is of a sense and magnitude representative of the deviation of the actual motor speed from the predetermined speed.

With reference to FIG. 2, there is shown the response curve for the system of the invention. The balance frequency ($f_0$) of bridge 26 is indicated at point 61 whereat no error signal 27 is developed. The system response curve exhibits straight line portions at and near the balance frequency, the straight lines intersecting sharply at point 61 where the response curve reverses phase or sense. Thus, when the speed of motor 11 deviates above or below the predetermined speed, the magnitude and the direction of error signal 27 increase linearly near point 61 before the response curve becomes non-linear and saturated. Therefore, in the system of this invention, control of the motor speed is linear and most sensitive at and near the predetermined speed.

Frequency sensitive circuit 26 need not be a Wien bridge but may be some other conventional circuit, such as twin-T or bridge-T network, which is adjustable to balance in response to a signal of a predetermined frequency, and whose response curve is linear at and near its balance frequency. One skilled in the art would be able to modify the system of this invention to operate with a twin-T or bridge-T network if it were desirable to do so.

Detector

FIG. 4 shows the circuits which comprise detector 31. Reference signal 19 is applied over leads 23 and 24 to a pulse shaper 71. Pulse shaper 71 may be any of a number of conventional circuits for transforming an A.C. signal into a pulse signal, for example a bistable multivibrator circuit known as a Schmitt trigger. Pulse shaper 71 generates a plurality of digital reference pulses 72 which correspond to the cycles of reference signal 19 applied to it. Thus, each revolution of the motor's actual speed is represented by a plurality of digital reference pulses 72.

Error signal 27 is applied over lead 28 to a linear amplifier 73 to produce an amplified error signal 74 which is applied to a pulse shaper 76. Pulse shaper 76 may also be a Schmitt trigger multivibrator.

In response to error signal 74, pulse shaper 76 generates a plurality of digital error pulses 77 which correspond to the cycles of error signal 27 applied to it. Digital reference pulses 72 and digital error pulses 77 are applied to a bistable trigger circuit 81, which may be a conventional bistable multivibrator circuit. A bistable multivibrator is characterized in that it has two stable states of operation; that is, the bistable circuit remains in one stable state of operation until triggered into its second state of operation by an external pulse.

Bistable circuit 81 is triggered into its first or "1" state of condition by digital error pulses 77, and is triggered into its second or "0" state by digital reference pulses 72. As stated previously, error signal 27 has a sense and magnitude representative of the deviation of the actual motor speed from the predetermined motor speed. Thus, digital error pulses 77 are in phase with, or either lead or lag the digital reference pulses 72; depending upon whether the motor speed is at the predetermined speed, or is either greater than or less than the predetermined speed. For purposes of describing the invention, error pulses 77 arbitrarily lead reference pulses 72 when the speed of motor 11 is greater than the predetermined speed.

Referring to FIG. 6, when digital error pulses 77 lead reference digital pulses 72, (Lines B and C) the first error pulse 82 triggers bistable circuit 81 to the "1" state (Line A). The first reference pulse 83 thereafter triggers bistable circuit 81 back to the "0" state. This action produces a first negative-going correction pulse 84 (Line A) which indicates that the actual motor speed is greater than the predetermined speed. The second error pulse 86 then triggers bistable circuit 81 back to the "1" state. Digital error pulses 77 and digital reference pulses 72 continue to cycle bistable circuit 81 between the "1" and "0" states to produce a train of negative-going digital correction pulses 91 so long as the speed of motor 11 continues to be greater than the predetermined speed.

When digital error pulses 77 lag digital reference pulses 72 (Lines C and D), bistable circuit 81 produces a train of correction pulses 93 (Line E) in a manner similar to that described above. More particularly, the first reference pulse 83 triggers bistable circuit 81 to the "0" state. The first error pulse 96 thereafter trigers bistable circuit 81 back to the "1" state to produce a positively-going correction pulse 97 (Line E) which indicates that the actual motor speed is less than the predetermined speed. Reference pulses 72 and error pulses 77 continue to cycle bistable circuit 81 between the "0" and "1" state to produce the train of positively going correction pulses 93 so long as the speed of motor 11 continues to be less than the predetermined speed.

The train of correction pulses, either 91 or 93, is fed to a directional integrator circuit 94 which may be any of a number of conventional integrator circuits, for example a Miller type integrator circuit.

The output of directional integrator 94 produced in response to negative-going correction pulses 91 is a low order D.C. voltage signal near the voltage level represented by the "0" state. Likewise, the output of directional integrator 94 produced in response to positive-going correction pulses 93 is a low order D.C. voltage signal near the voltage level represented by the "1" state. Arbitrarily, the "0" state can be considered as being positive with respect to the "1" state. Thus, directional integrator 94 produces a positive voltage signal when the actual speed is greater than the predetermined speed, the magnitude of the positive signal being an indication of how much greater. Likewise, directional integrator 94 produces a negative signal when the actual speed is less than the predetermined speed, the magnitude of the negative signal being an indication of how much less.

Error signal 74, in addition to being fed to pulse shaper 76, is also fed to a junction 103 and then over lead 33 to motor controller 32. Error signal 74, as mentioned previously, is an indication of the magnitude of the deviation. Thus error signal 74 and the output of directional integrator 94, which is fed over lead 34 to motor controller 32, comprise a correction signal which energizes motor controller 32 to adjust the speed of the motor 11 in a conventional manner as described above.

Error signal 74 is also fed to junction 103, and then over a lead 105 to an error check network 111, which comprises a comparator 112 connected by a lead 114 to an A.C. switch 113 which is connected to junctions 116 and 117. Error check circuit 111 senses whether a signal applied to junction 103 is a true error signal 74, or is noise or other transient signals. Error check network 111 renders bistable circuit 81 of detector 31 inoperative when noise signals are applied to junction 103. Under these circumstances, motor controller 32 is not effective to adjust the actual speed of motor 11 in any manner.

Comparator 112 is a conventional voltage comparison circuit in which an applied voltage is compared with a reference voltage. In the system of this invention, the reference voltage is set such that comparator 112 produces a signal output for an input signal having a magnitude equal to or less than the magnitude of the second harmonic of error signal 74 at the balance frequency $f_0$ (see FIG. 2).

Theoretically, there should be no error signal 74 from frequency sensitive circuit 26 at the balance frequency, but in practice there are second and higher order harmonics of error signal 74 being developed. These harmonics of error signal 74 are of a lower order magnitude than a true error signal 74. Likewise, noise signals are generally of a lower order magnitude than a true error signal 74. Thus, there is an output from comparator 112 when noise signals or second order harmonics of error signal 74 are applied to junction 103.

When the noise signals are applied to comparator 112, it develops an output signal which is applied over lead 114 to A.C. switch 113. Referring to FIG. 5, the output signal from comparator 112 is fed over lead 114 in parallel to the bases of transistors 121 and 122 to render them conductive. Negative power supply 123 is then applied through conductive transistors 121 and 122 to the bases of transistors 124 and 126 to render them conductive. An A.C. path is now completed from junction 116 over lead 127 through transistor 124 to ground, and from junction 117 through transistor 126 to ground.

Reference pulses 72 applied at junction 116, and the noise signals applied at junction 117 by pulse shaper 76 are diverted through the respective A.C. paths to ground. Thus no reference pulses 72 or noise signals are applied to bistable circuit 81. Therefore, there is no output from bistable circuit 81 which can be applied through directional integrator 94 to operate motor controller 32.

The representation of the revolutions of the motor shaft by a plurality of digital reference pulses 72, and the representation of the deviation of actual speed from the predetermined speed by a plurality of digital error pulses 77, enables the system of this invention to maintain finite, linear control over the motor speed. This system will sense a deviation of only a fraction of a revolution, since a plurality of digital pulses represent a single revolution. This enables motor 11 to be returned to the predetermined speed from the direction of error only, without overshoot, long before the deviation reaches the nonlinear portion of the system response curve (FIG. 2).

For example in FIG. 2, if point 121 is arbitrarily taken to be a deviation of one revolution, then the deviation between the actual speed and the predetermined speed at point 61 is linearly represented by a plurality of digital error pulses 77. Motor controller 32 is then operated to correct the motor speed from point 121 toward point 61 only until the deviation, and therefore error signal 74, is zero. There will be no overshoot past point 61, which represents the predetermined speed, because there is no error signal 74 applied to junction 103. As explained above, error check circuit 111, renders detector 31 ineffective to affect the motor speed in any manner when error signal 74 is zero.

In an actual use of the system of this invention, speed sensor 16 can be arranged to detect the speed of a cable being taken up on a reel, or to detect the speed of a capstan feeding a cable take-up reel. Such arrangements are well known to those skilled in the art. It is to be understood that in such arrangements, the maintaining of a cable being taken up on a reel or of a capstan at a predetermined speed is equivalent to maintaining a motor at a predetermined speed.

It is to be understood that the above identified embodiment of the system for maintaining a motor at a predetermined speed is merely illustrative of the principles of the invention, and other embodiments of the system may be devised without departing from the scope of the invention.

What is claimed is:

1. A system for maintaining a motor at a predetermined speed, comprising:
   means for sensing the actual speed of the motor and for generating a reference signal having a frequency representative of the actual speed,
   a frequency sensitive bridge network circuit, including components which have electrical parameters selectively variable to render the circuit balanced at an applied signal frequency representative of the predetermined speed, and responsive to the reference signal for producing an error signal indicative of a deviation of actual speed from predetermined speed,
   a detector, including means responsive to the reference signal for producing digital reference pulses to linearly represent the actual speed and means responsive to the error signal for producing digital error pulses to linearly represent the deviation, for producing a correction signal indicative of the magnitude and sense of the deviation, and
   motor control means responsive to the correction signal for returning the motor to the predetermined speed.

2. A system for maintaining a motor at a predetermined speed, comprising:
   means for sensing the actual speed of the motor and for generating a reference signal having a frequency representative of the actual speed,
   a frequency sensitive circuit, including components which have electrical parameters selectively variable to render the circuit balanced at an applied signal frequency representative of the predetermined speed, and responsive to the reference signal for producing an error signal indicative of a deviation of actual speed from predetermined speed,
   a detector, including means responsive to the reference signal for producing digital reference pulses to linearly represent the actual speed and means responsive to the error signal for producing digital error pulses to linearly represent the deviation, for producing a correction signal indicative of the magnitude and sense of the deviation,
   motor control means responsive to the correction signal for returning the motor to the predetermined speed, and
   an error check circuit responsive to noise signals for rendering the detector ineffective to produce a correction signal to prevent the detector from producing a false correction signal.

3. A system for maintaining a motor at a predetermined speed, comprising:
   means for sensing the actual speed of the motor and for generating a reference signal of a frequency representative of the actual speed,
   a frequency sensitive circuit including electrical components which have electrical parameters selectively variable to render the circuit balanced at an applied reference frequency representative of the predetermined speed,
   means responsive to the reference signal for producing a plurality of digital reference pulses to linearly represent the actual speed,
   means for coupling the reference signal to energize the frequency sensitive circuit which produces an error signal when the actual speed deviates from the predetermined speed, the error signal being indicative of the deviation of the actual speed from the predetermined speed,
   means responsive to the error signal for producing a plurality of digital error pulses to linearly represent the deviation,
   means responsive to the reference pulses and the error pulses for producing digital correction pulses indicative of the magnitude and sense of the deviation, and
   motor control means responsive to the digital correction pulses for correcting the direction and the magnitude of deviation of the actual speed from the predetermined speed.

4. The system for maintaining a motor at a predetermined speed according to claim 3, additionally comprising an error check circuit responsive to noise signals for rendering the means for producing a correction signal ineffective, thereby preventing the motor control means from adjusting the speed of the motor.

5. The system for maintaining a motor at a predetermined speed according to claim 4, wherein the means for sensing the actual speed of the motor comprises an optical tachometer.

6. The system for maintaining a motor at a predetermined speed according to claim 4, wherein the means for sensing the actual speed of the motor comprises an optical tachometer, including
   a source of light for producing light rays directed towards the rotating motor shaft, and
   photoelectric means responsive to the light rays reflected from the motor shaft for generating the reference signal.

7. The system for maintaining a motor at a predetermined speed according to claim 4, wherein the frequency sensitive circuit is a Wien bridge.

8. The system for maintaining a motor at a predetermined speed according to claim 4, wherein the means responsive to the reference pulses and error pulses includes a bistable multivibrator circuit having a first state of conduction representing one sense of deviation and a second state of conduction representing the other sense of deviation.

9. A system for maintaining a motor at a predetermined speed, wherein control of the motor is most linear at and near the predetermined speed, comprising:
   a Wien bridge including resistors and capacitors which are selectively variable to render the bridge balanced at an applied signal frequency representative of the predetermined speed, means for sensing the actual speed of the motor and for producing a plurality of electrical signal cycles for each revolution of the motor shaft to establish a reference signal having a frequency representative of the actual motor speed, means for coupling the reference signal to the input terminals of the bridge such that when the frequency of the reference signal deviates from the signal frequency representative of the predetermined speed, the bridge produces an error signal representative of the magnitude of the deviation of actual speed from the predetermined speed, a bistable trigger circuit coupled to receive reference signal and the error signal, the bistable trigger circuit being triggerable to a first stable state by the reference signal and being triggerable to a second stable state by the error signal, for producing digital correction pulses representative of the sense of the deviation of the actual speed from the predetermined speed, and a motor controller responsive to the error signal and to the correction pulses for returning the motor to the predetermined speed.

10. The system for maintaining a motor at a predetermined speed according to claim 9, further comprising first and second pulse shaper circuits, coupled to the reference signal producing means and the bridge respectively, for converting the reference signal and the error signal to a shape suitable for triggering the bistable trigger circuit.

11. The system for maintaining a motor at a predetermined speed according to claim 10, further comprising means coupled to the first and second pulse shaper circuits, the Wien bridge, and the bistable trigger circuit, for distinguishing between a true error signal and noise signals and for rendering the bistable trigger circuit ineffective to produce false digital correction pulses.

12. The system for maintaining a motor at a predetermined speed according to claim 11, further comprising a directional integrator circuit coupled to the bistable trigger circuit and the motor controller for integrating the digital correction pulses and for providing a polar voltage for energizing the motor controller to return the motor to the predetermined speed.

References Cited

UNITED STATES PATENTS

| 2,803,793 | 8/1959 | Wible | 318—318 X |
| 3,176,208 | 3/1965 | Gifft | 318—314 |
| 3,295,039 | 12/1966 | MacDonald et al. | 318—314 |

ORIS L. RADER, *Primary Examiner.*

J. J. BAKER, *Assistant Examiner.*